(12) United States Patent
Nessett et al.

(10) Patent No.: US 6,920,559 B1
(45) Date of Patent: Jul. 19, 2005

(54) USING A KEY LEASE IN A SECONDARY AUTHENTICATION PROTOCOL AFTER A PRIMARY AUTHENTICATION PROTOCOL HAS BEEN PERFORMED

(75) Inventors: Danny M. Nessett, Fremont, CA (US); Albert Young, Cupertino, CA (US); Bob O'Hara, Santa Clara, CA (US); Joe Tsai, Saratoga, CA (US); BoFu Chen, Fremont, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/561,416

(22) Filed: Apr. 28, 2000

(51) Int. Cl.[7] .............................................. H04L 9/00
(52) U.S. Cl. ..................... 713/168; 713/155; 713/158; 713/171; 380/247
(58) Field of Search ................................ 713/168, 156, 713/158, 178, 155, 171; 380/247; 455/410, 411

(56) References Cited

U.S. PATENT DOCUMENTS

| | | | | | |
|---|---|---|---|---|---|
| 5,371,794 | A | * | 12/1994 | Diffie et al. | 713/156 |
| 5,633,933 | A | * | 5/1997 | Aziz | 380/30 |
| 5,794,139 | A | * | 8/1998 | Mizikovsky et al. | 455/403 |
| 5,850,444 | A | * | 12/1998 | Rune | 705/79 |
| 5,864,667 | A | * | 1/1999 | Barkan | 713/201 |
| 6,058,477 | A | * | 5/2000 | Kusakabe et al. | 713/169 |
| 6,516,316 | B1 | * | 2/2003 | Ramasubramani et al. | 707/9 |
| 6,580,906 | B2 | * | 6/2003 | Bilgic et al. | 455/422.1 |
| 6,636,968 | B1 | * | 10/2003 | Rosner et al. | 713/178 |
| 6,643,774 | B1 | * | 11/2003 | McGarvey | 713/155 |

* cited by examiner

*Primary Examiner*—Gilberto Barrón Jr
*Assistant Examiner*—Kaveh Abrishamkar

(57) ABSTRACT

The present invention provides a method and system for using a key lease in a secondary authentication protocol after a primary authentication protocol has been performed. In one embodiment, the primary authentication protocol comprises a strong, secure, computationally complex authentication protocol. Moreover, the secondary authentication protocol comprises a less complex (compared to the primary authentication protocol) and less secure (compared to the primary authentication protocol) authentication protocol which can be performed in a length of time that is shorter than a length of time required to perform the primary authentication protocol. In one embodiment, a wireless client electronic system (WC) completes the primary authentication protocol with a wireless network access point electronic system of a wireless network (AP). When the WC is required to authenticate with another AP, the WC authenticates itself with another AP by using the secondary authentication protocol. However, the WC is required to periodically complete the primary authentication protocol, guarding against the possibility that the secondary authentication protocol may be exploited by an unauthorized intruder to attack the wireless network. In one embodiment, a third party technique is implemented to store a key necessary to perform the secondary authentication protocol.

51 Claims, 10 Drawing Sheets

270

| | |
|---|---|
| FIRST IDENTIFIER-CLIENT | 271 |
| FIRST SHARED SECRET KEY | 272 |
| SECOND SHARED SECRET KEY | 273 |
| KEY LEASE PERIOD | 274 |
| INTEGRITY FUNCTION DATA | 275 |
| SECOND IDENTIFIER-AP GROUP | 276 |

FIG. 2A

USING A KEY LEASE IN A SECONDARY AUTHENTICATION PROTOCOL AFTER A PRIMARY AUTHENTICATION PROTOCOL HAS BEEN PERFORMED

BACKGROUND OF THE INVENTION

1. Field of the Invention

The present invention generally relates to the field of networks. More particularly, the present invention relates to the field of network security.

2. Related Art

Computer systems and other electronic systems or devices (e.g., personal digital assistants, cellular phones, etc.) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic system is dramatically enhanced by coupling these stand-alone electronic systems together to form a networking environment. Within a networking environment, users may readily exchange files, share information stored on a common database, pool resources, and communicate via electronic mail (e-mail) and via video teleconferencing.

In a network environment, there are three basic techniques used to achieve mutual authentication between two parties, whereas each party is an electronic system within the networked environment such as a wireless client electronic system or a network access point electronic system. In the first basic technique, public key cryptography is used. According to public key cryptography, the two parties sign (i.e., provide a digital signature for) a message using their respective private keys, while they authenticate (i.e., verify the origin of) the message using the other party's public key. In the second basic technique, the two parties hold a shared secret. Each party signs a message using the shared secret, while the other authenticates the message using the shared secret. In the third basic technique, the two parties hold a shared secret with a third-party such as an authentication authority. Each party signs the message using the third-party shared secret. The message is forwarded to the third party by the receiving party for verification or transformation. When the third-party verifies, it simply tells the receiving party whether the message is authentic. When the third-party transforms, it re-signs the message with the receiving party's shared secret, returning it to the receiving party for verification.

Each of the three basic techniques has its strengths and weaknesses. From a purely security perspective, implementing public key cryptography is preferred over the other basic techniques. However, public key cryptography requires a significant public key infrastructure. For particular applications that do not need this public key infrastructure for other purposes (e.g., IPSec), deployment of the public key infrastructure can create a significant market barrier to prospective customers of network environment equipment.

The next preferred basic technique from a security perspective implements a secret shared between two parties. This basic technique is inferior to public key cryptography because signing a message with such a shared secret does not actually authenticate the sender of the message. This basic technique just raises the receiving party's confidence that the sender of the message knows the shared secret. This may seem like an insignificant distinction, but there are certain types of attacks against authentication protocols by using shared secrets (e.g., reflection attacks) that complicate those authentication protocols.

The third basic technique, i.e., implementing secrets shared with a third-party, is the least attractive from a security perspective. However, the third basic technique is, in many cases, the most attractive approach from a management and deployment point of view. The use of public key cryptography and shared secrets imposes non-trivial administration burdens on the deploying organization. As previously indicated, public key cryptography normally requires the deployment of a Public Key Infrastructure, which is costly from an initial investment as well as an operational perspective. Pair wise shared secrets require extensive management of those secret keys, since each sending party must obtain, store, and manage (e.g., revoke) the secret keys shared with all other parties in the network environment. When implementing secrets shared with a third party, each party need only obtain and store one secret key. Many secret key management functions can be centralized in the third-party itself.

In a wireless network that requires a client electronic system (which is mobile and is capable of roaming) to authenticate itself to the wireless network before the client electronic system is allowed to use the resources of the wireless network, the repeated use of strong, computationally complex authentication methods can be a significant burden to both the client electronic system and the wireless network. In particular, a client electronic system that is roaming may be unable to authenticate itself to a network access point electronic system of the wireless network because the strong, computationally complex authentication method may require a longer period of time to complete than the period of time available before the client electronic system switches to another network access point electronic system of the wireless network. Typically, the strong, computationally complex authentication method may take a few seconds to complete.

Therefore, what is needed is a method and system for using a key lease in a secondary authentication protocol after a primary authentication protocol has been performed.

SUMMARY OF THE INVENTION

Accordingly, the present invention provides a method and system for using a key lease in a secondary authentication protocol after a primary authentication protocol has been performed. In one embodiment, the primary authentication protocol comprises a strong, secure, computationally complex authentication protocol. Moreover, the secondary authentication protocol comprises a less complex (compared to the primary authentication protocol) and less secure (compared to the primary authentication protocol) authentication protocol which can be performed in a length of time that is shorter than a length of time required to perform the primary authentication protocol. In one embodiment, a wireless client electronic system (WC) completes the primary authentication protocol with a wireless network access point electronic system of a wireless network (AP). When the WC is required to authenticate with another AP, the WC authenticates itself with another AP by using the secondary authentication protocol. However, the WC is required to periodically complete the primary authentication protocol, guarding against the possibility that the secondary authentication protocol may be exploited by an unauthorized intruder to attack the wireless network. In one embodiment, a third party technique is implemented to store a key necessary to perform the secondary authentication protocol.

Once the primary authentication protocol is completed by the WC and an AP, the AP transmits a key lease to the WC. In one embodiment, the key lease comprises a data structure having a plurality of data for enabling the WC to authenticate itself with another AP. The key lease is encrypted with a key which the WC does not possess and which the WC cannot obtain. Moreover, the key lease is valid for a period determined by a key lease period which is included in the key lease. In one embodiment, the key lease is encrypted with one of a plurality of keys. The third party stores the plurality of keys. Moreover, the third party transmits an appropriate one of the plurality of keys to the AP to enable the WC and the AP to perform the secondary authentication protocol if the key lease period has not expired. In one embodiment, the wireless network access point electronic systems of the wireless network are divided into groups. Each group is assigned a separate key for encrypting the key lease.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 2A illustrates a key lease according to an embodiment of the present invention.

Figure 1:
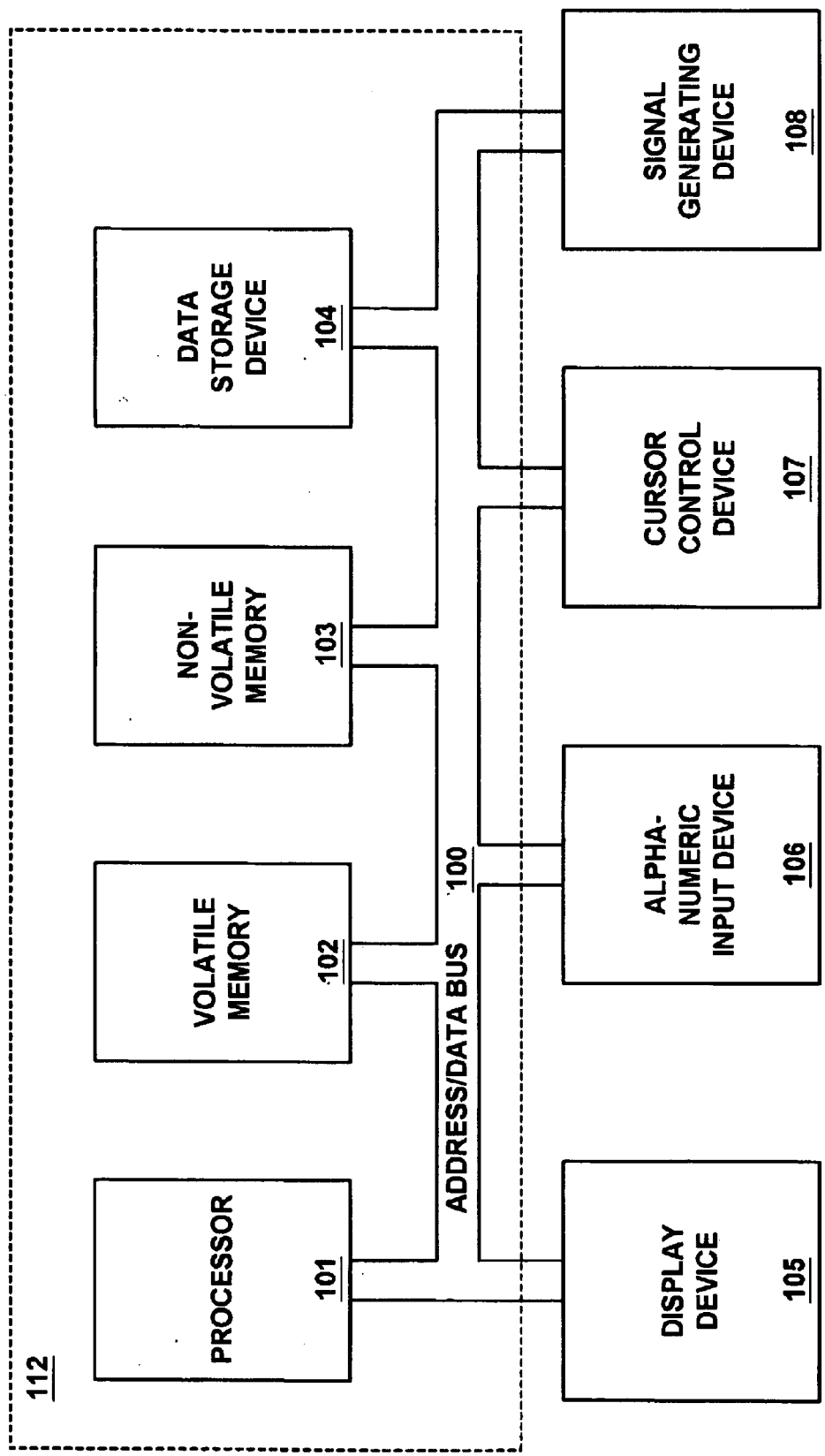
FIG. 1 illustrates an exemplary electronic system platform upon which embodiments of the present invention may be practiced.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "canceling", "assigning", "receiving", "forwarding", "dumping", "updating", "bypassing", "transmitting", "determining", "retrieving", "displaying", "identifying", "modifying", "processing", "preventing", "using", "sending", "adjusting" or the like, refer to the actions and processes of an electronic system or a computer system, or other electronic computing device/system such as a personal digital assistant (PDA), a cellular phone, a pager, etc. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Exemplary Electronic System

With reference to FIG. 1, portions of the present invention are comprised of computer-readable and computer executable instructions which reside, for example, in computer-usable media of an electronic system such as a computer system. FIG. 1 illustrates an exemplary electronic system 112 on which embodiments of the present invention may be practiced. It is appreciated that the electronic system 112 of FIG. 1 is exemplary only and that the present invention can operate within a number of different computer systems including general-purpose computer systems and embedded computer systems.

Electronic system 112 includes an address/data bus 100 for communicating information, a central processor 101 coupled with bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Electronic system 112 also includes a data storage device 104 ("disk subsystem") such as a magnetic or optical disk and disk drive coupled with the bus 100 for storing information and instructions. Data storage device 104 can include one or more removable magnetic or optical storage media (e.g., diskettes, tapes) which are computer readable memories. Memory units of electronic system 112 include volatile memory 102, non-volatile memory 103 and data storage device 104.

Electronic system 112 can further include an optional signal generating device 108 (e.g., a wireless network interface card "NIC") coupled to the bus 100 for interfacing with other computer systems. Also included in exemplary system 112 of FIG. 1 is an optional alphanumeric input device 106 including alphanumeric and function keys coupled to the bus 100 for communicating information and command selections to the central processor 101. Electronic system 112 also includes an optional cursor control or directing device 107 coupled to the bus 100 for communicating user input information and command selections to the central processor 101. An optional display device 105 can also be coupled to the bus 100 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

Exemplary Network Environment

Figure 2:
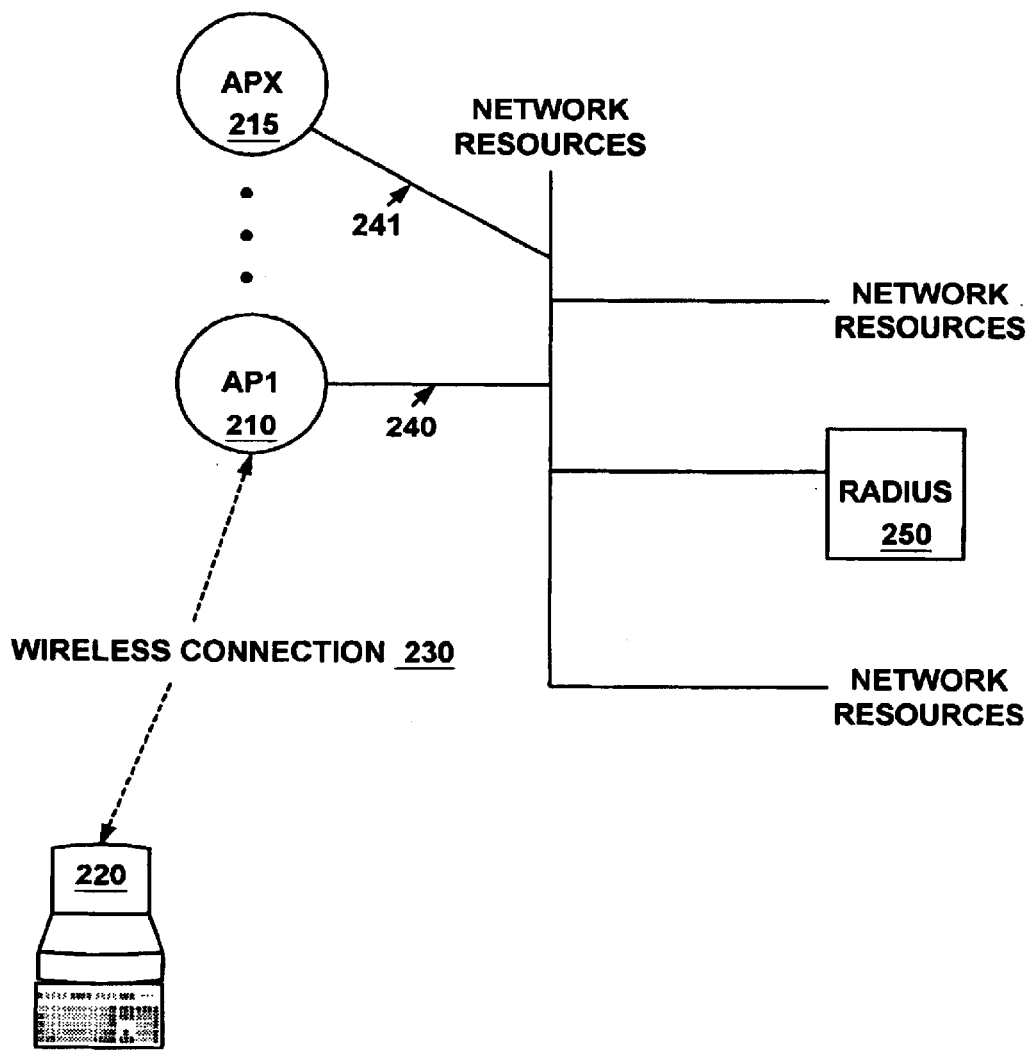
FIG. 2 is a graphical representation of an exemplary wireless network in which embodiments according to the present invention may be practiced.

Embodiments of the present invention, a method and system for using a key lease in a secondary authentication protocol after a primary authentication protocol has been performed, may be practiced in a wireless network environment. FIG. 2 illustrates an exemplary wireless network 200 in which embodiments of the present invention may be practiced. As illustrated, wireless network 200 includes a network access point electronic system (AP1) 210 that is coupled to a wireless client electronic system (WC) 220 via a wireless connection 230. More than one wireless client electronic system may be coupled to the wireless network 200. In addition, the wireless network 200 may include one or more additional network access point electronic systems (APX) 215. There are many techniques for implementing wireless connection 230, including infrared transmission, spread spectrum radio transmission, narrowband radio transmission, or some other technology that does not require a physical connection between the wireless client electronic system and the network access point electronic system. AP1 210 and APX 215 may be implemented with an electronic system (e.g., electronic system 112). In the present embodiment, the AP1 210 and APX 215 are coupled to a number of network resources (e.g., file servers, printers, Internet gateways, etc.) via connection 240 and connection 241 respectively.

Additionally, the wireless network 200 includes a RADIUS server 250. The RADIUS server 250 functions as a third party (i.e., an authentication resource) for enabling the WC 220 and a wireless network access point electronic system (e.g., AP1 210 or APX 215) to perform a secondary authentication protocol. In another embodiment, a shared secret key (for performing the secondary authentication protocol) can be stored locally by the wireless network access point electronic system (e.g., AP1 210 or APX 215) rather than being stored at a third party (e.g., RADIUS server 250). Moreover, the RADIUS server 250 can be utilized to enable the WC 220 and a wireless network access point electronic system (e.g., AP1 210 or APX 215) to perform a primary authentication protocol. The primary authentication protocol comprises a strong, secure, computationally complex authentication protocol.

In one embodiment, an authentication protocol described in the pending patent application "AUTHENTICATED DIFFIE-HELLMAN KEY AGREEMENT PROTOCOL WHERE THE COMMUNICATING PARTIES SHARE A SECRET WITH A THIRD PARTY" (Ser. No. 09/560,396, filed on Apr. 28, 2000 by Danny M. Nessett, Albert Young, Bob O'Hara, Joe Tsai, and Bofu Chen, assigned to the assignee of the present application), is implemented as the primary authentication protocol. In addition, the primary authentication protocol enables the WC 220 and the wireless network access point electronic system (e.g., AP1 210 or APX 215) to establish a first shared secret key for encrypting communications transmitted between the WC 220 and the wireless network access point electronic system (e.g., AP1 210 or APX 215). It should be understood that any other authentication protocol can be implemented as the primary authentication protocol. The secondary authentication protocol comprises a less complex (compared to the primary authentication protocol) and less secure (compared to the primary authentication protocol) authentication protocol which can be performed in a length of time that is shorter than a length of time required to perform the primary authentication protocol.

In some conventional wired networks where communication relies on physical security, a client electronic system may transmit and receive information (i.e., communicate) via the wired network without any encryption. However, in the wireless network 200, communications between the AP1 210 and the WC 220 can be easily intercepted by casual eavesdroppers and intruders. According to the present invention, the wireless network 200 requires the WC 220 to perform the primary authentication protocol with a wireless network access point electronic system (e.g., AP1 210 or APX 215). The primary authentication protocol facilitates establishing the first shared secret key between the WC 220 and the wireless network access point electronic system (e.g., AP1 210 or APX 215). The WC 220 may roam as it communicates with the wireless network 200.

Since the WC 220 moves from one physical location to a second physical location, the WC 220 may be required to authenticate once again if the WC 220 communicates with a second wireless network access point electronic system of the wireless network 200 (i.e., a wireless network access point electronic system other than the wireless network access point electronic system with which the WC 220 performed the primary authentication protocol). Rather than performing the primary authentication protocol once again, the present invention provides the secondary authentication protocol which the WC 220 performs with the second wireless network access point electronic system. A key lease (which is transmitted to the WC 220 after successfully completing the primary authentication protocol) facilitates directing the WC 220 to perform the proper authentication protocol (the primary authentication protocol or the secondary authentication protocol). Thus, the present invention enables the WC 220 to roam and to authenticate itself to a wireless network 200 without interrupting a communication connection with the wireless network 200.

Once the primary authentication protocol is successfully completed, a first wireless network access point electronic system (first AP) (e.g., AP1 210 or APX 215) transmits a key lease to the WC 220. In one embodiment, the key lease comprises a data structure.

FIG. 2A illustrates a key lease 270 according to an embodiment of the present invention. The key lease 270 includes a first identifier 271 associated with the WC 220 and utilized in the primary authentication protocol performed by the WC 220 with the first AP, the first shared secret key 272 established during the primary authentication protocol with the first AP, and a second shared secret key 273 for encrypting communications transmitted between the WC 220 and a second wireless network access point electronic system (second AP)(e.g., AP1 210 or APX 215) during the secondary authentication protocol. In one embodiment, the first identifier 271 is a user identifier associated with the WC 220. In another embodiment, the first shared secret key 272 and the second shared secret key 273 are equivalent, thus minimizing the number of shared secret keys which need to be managed.

Moreover, the key lease 270 further comprises a key lease period 274 for indicating a length of time in which the key lease 270 is valid. During the lease key period 274, the WC 220 can perform the secondary authentication protocol with the second AP instead of performing the primary authentication protocol. If the key lease period 274 expires, the WC 220 is required to perform the primary authentication protocol with the second AP. The key lease period 274 can be any length of time. For example, the key lease period 274 can be 24 hours or 8 hours, whereas a long key lease period reduces the number of times that the WC 220 needs to perform the primary authentication protocol.

The key lease 270 also comprises integrity function data 275 for determining an unauthorized change to a first portion of the key lease 270. The integrity function data is generated by processing the first portion of the key lease 270 with an integrity function. The integrity function data is utilized to reveal any tampering with the first portion of the key lease 270. In one embodiment, the first portion of the key lease 270 comprises the first identifier 271, the first shared secret key 272, the second shared secret key 273, and the key lease period 274.

The key lease 270 also comprises a second identifier 276 associated with a particular wireless network access point electronic system group. The second identifier facilitates dividing the plurality of wireless network access point electronic systems (e.g., AP1 210 and APX 215) into a plurality of wireless network access point electronic system groups. In one embodiment, a second portion of the key lease 270 is encrypted with a third shared secret key corresponding to the second identifier 276 associated with the wireless network access point electronic system (e.g., AP1 210 and APX 215) with which the WC 220 performed the primary authentication protocol. In one embodiment, the second portion of the key lease 270 comprises the first identifier 271, the first shared secret key 272, the second shared secret key 273, the key lease period 274, and the integrity function data 275.

In one embodiment, the third shared secret key is available to the RADIUS server 250 (or authentication resource) and to the wireless network access point electronic systems which belong to the wireless network access point electronic system group associated with the second identifier. Since WC 220 does not know the third shared secret key, WC 220 cannot decrypt the key lease, nor create another key lease. The RADIUS server 250 stores the third shared secret key corresponding to the second identifier. When the RADIUS server 250 receives a request for the third shared secret key from a wireless network access point electronic system (e.g., AP1 210 or APX 215), the RADIUS server 250 looks-up the third shared secret key corresponding to the second identifier of the wireless network access point electronic system. In one embodiment, the RADIUS server 250 authenticates the wireless network access point electronic system requesting the third shared secret key. It should be understood by one of ordinary skill in the art that the third party or authentication resource can be implemented as a server other than a RADIUS server 250 or as any other appropriate implementation. In another embodiment, the third shared secret key can be stored locally by the wireless network access point electronic system rather than being stored at a third party (e.g., RADIUS server 250).

Figure 3:
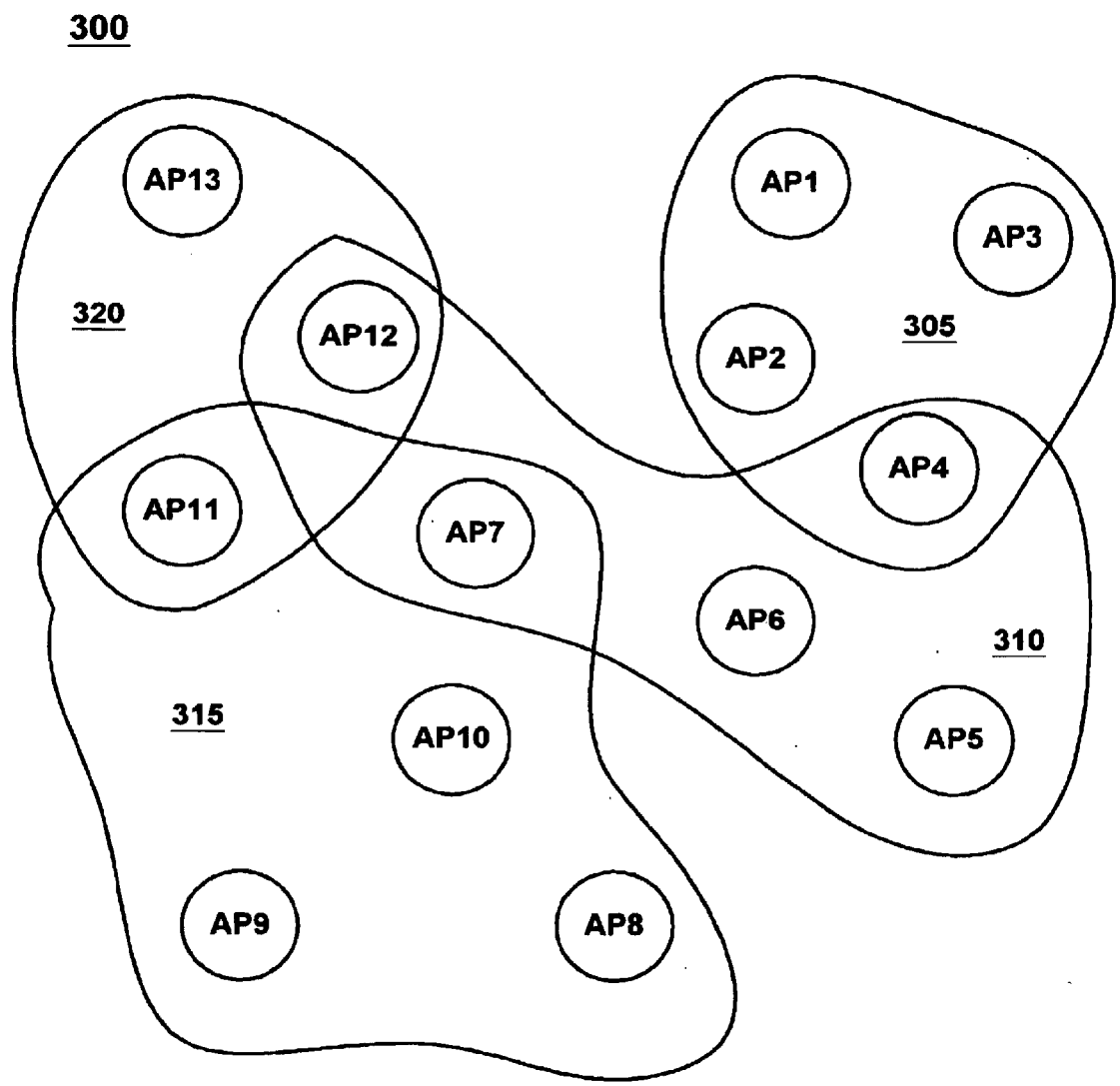
FIG. 3 is a graphical representation of the grouping of the wireless network access point electronic systems according to one embodiment of the present invention.

FIG. 3 is a graphical representation 300 of the grouping of the wireless network access point electronic systems AP1–AP13 of the wireless network 200 (FIG. 2) according to one embodiment of the present invention. As illustrated in FIG. 3, the first network access point electronic system group 305 includes AP1, AP2, AP3, and AP4. The second network access point electronic system group 310 includes AP4, AP5, AP6, AP7, and AP12. The third network access point electronic system group 315 includes AP8, AP9, AP10, and AP11. The fourth network access point electronic system group 320 includes AP11, AP12, and AP13. In one embodiment, a wireless network access point electronic system can belong to more than one network access point electronic system group (e.g., AP12, AP7, AP4, and AP11). It should be understood that the grouping of network access point electronic systems of FIG. 3 is merely exemplary. Each network access point electronic system group is associated with a second identifier.

As an example, if the WC 220 (FIG. 2) performs the primary authentication protocol with AP1, the WC 220 can authenticate itself with AP1, AP2, AP3, or AP4 using the secondary authentication protocol before the key lease period expires.

As an example, if the WC 220 (FIG. 2) performs the primary authentication protocol with AP13, the WC 220 can authenticate itself with AP11 or AP12 using the secondary authentication protocol before the key lease period expires.

As an example, if the WC 220 (FIG. 2) performs the primary authentication protocol with AP8, the WC 220 can authenticate itself with AP7, AP8, AP9, AP10, or AP11 using the secondary authentication protocol before the key lease period expires.

As an example, if the WC 220 (FIG. 2) performs the primary authentication protocol with AP5, the WC 220 can authenticate itself with AP4, AP5, AP6, AP7, or AP12 using the secondary authentication protocol before the key lease period expires.

In one embodiment, the secondary authentication protocol comprises a mutual challenge-response protocol based on symmetric encryption. In another embodiment, the secondary authentication protocol comprises a mutual challenge-response protocol based on a keyed message authentication code. In still another embodiment, the secondary authentication protocol comprises a mutual challenge-response protocol based on a one-way hash function message authentication code (HMAC) implementation (e.g., HMAC-MD5, HMAC-SHA-1, etc.). It should be understood by one skilled in the art that the secondary authentication protocol can be implemented in any other appropriate manner.

Using the Key Lease to Authenticate

Figure 4A:
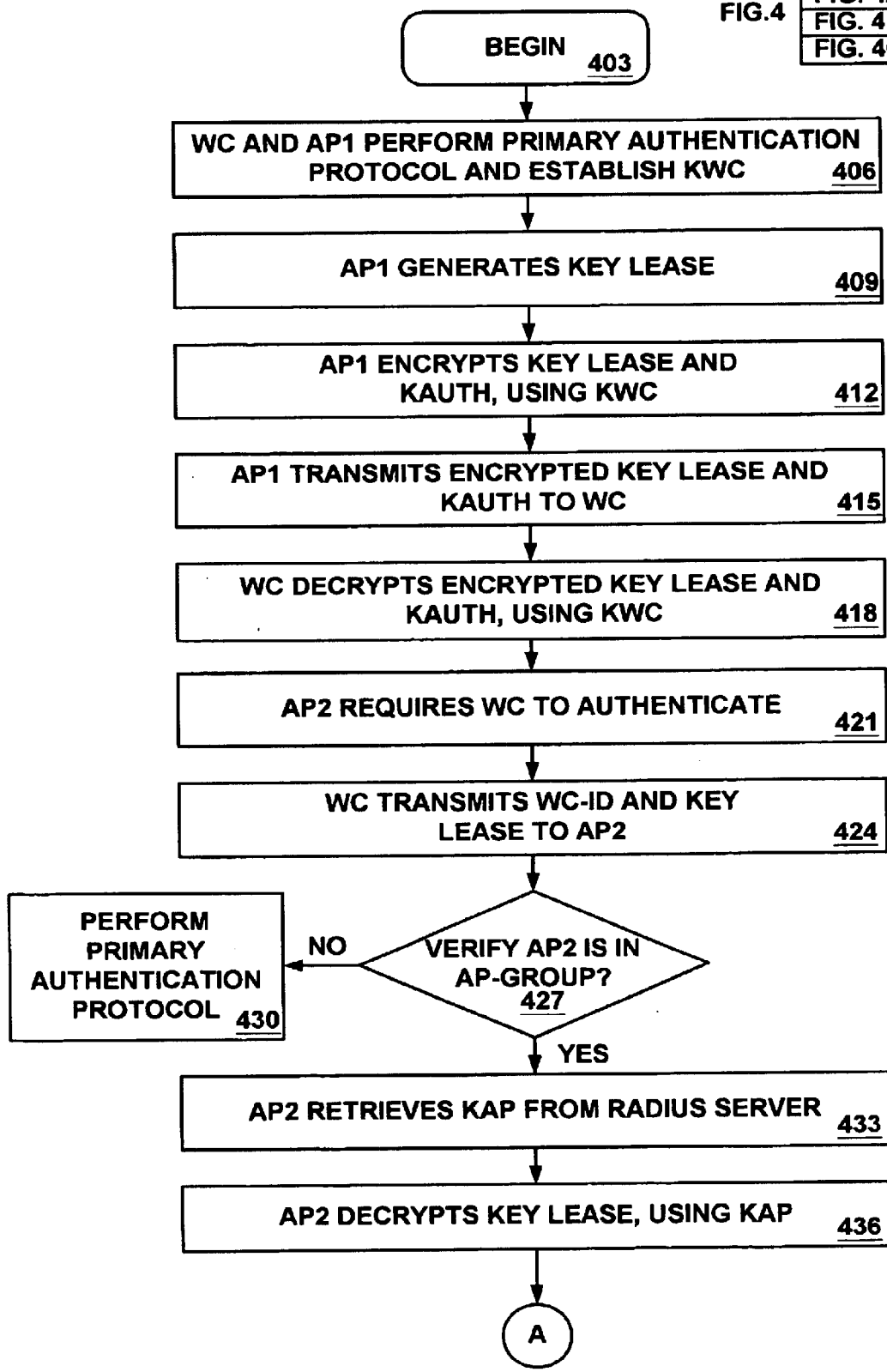
FIG. 4 is a flow chart diagram illustrating steps of authenticating a wireless client electronic system in accordance with one embodiment of the present invention.
Figure 4B:
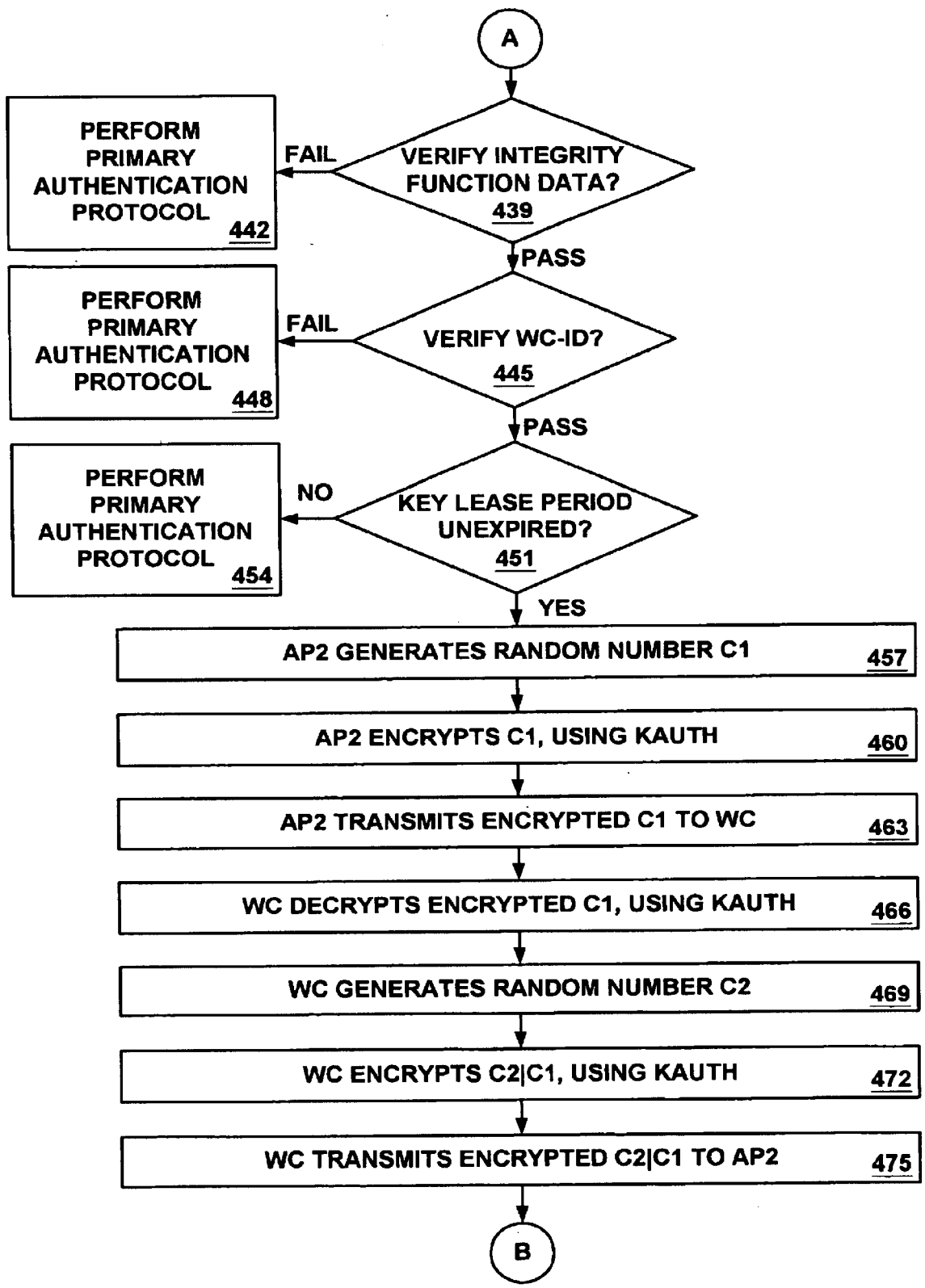
Figure 4C:
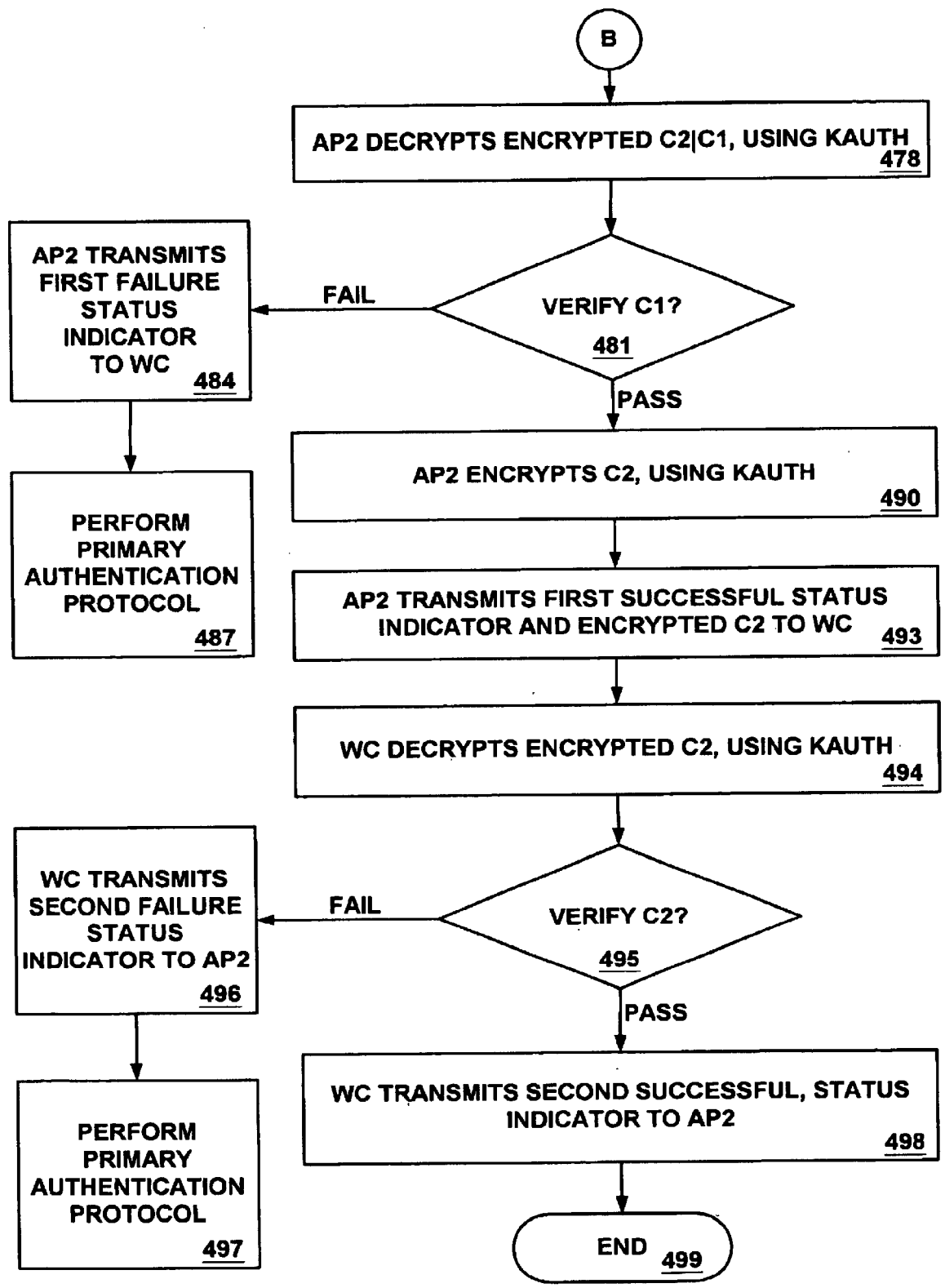

FIG. 4 is a flow chart diagram 400 illustrating steps of authenticating a wireless client electronic system (e.g., WC 220 of FIG. 2) to enable access to a wireless network 200 (FIG. 2) in accordance with one embodiment of the present invention. The WC 220 authenticates itself by performing either a primary authentication protocol or a secondary authentication protocol, depending on the data of the key lease.

At step 403, the method of authenticating the WC 220 according to one embodiment of the present invention begins. At step 406, the WC 220 authenticates itself to a first network access point electronic system (AP1) by performing a primary authentication protocol as discussed above. During the primary authentication protocol, WC 220 and AP1 establish a first shared secret key $K_{WC}$ for encrypting communications transmitted between WC 220 and AP1.

At step 409, AP1 generates the key lease. Alternatively, the authentication resource (e.g., RADIUS server 250) generates the first shared secret $K_{WC}$, a second shared secret key $K_{auth}$, and the key lease, and transmits via a secure encrypted channel the first shared secret $K_{WC}$, the second shared secret key $K_{auth}$, and the key lease to AP1. In one embodiment, the key lease comprises a first identifier WC-ID utilized during the primary authentication protocol, the first shared secret key $K_{WC}$, a second shared secret key $K_{auth}$, a key lease period, integrity function data, and a second identifier AP-GROUP associated with AP1, as discussed above. In one embodiment, the first identifier WC-ID, the first shared secret key $K_{WC}$, the second shared secret key $K_{auth}$, the key lease period, and the integrity function data are encrypted using a third shared secret key $K_{AP}$, whereas the third shared secret key $K_{AP}$ is available to AP1 but not to WC 220. The third shared secret key $K_{AP}$ corresponds to the second identifier AP-GROUP. In one embodiment, a RADIUS server 250 (FIG. 2) stores the third shared secret key $K_{AP}$. Since WC 220 does not know the third shared secret key $K_{AP}$, WC 220 cannot decrypt the key lease, nor create another key lease.

At step 412, AP1 encrypts the second shared secret key $K_{auth}$ and the key lease using the first shared secret key $K_{WC}$. In another embodiment, AP1 encrypts the second shared secret key $K_{auth}$ using the first shared secret key $K_{WC}$.

At step 415, AP1 transmits the encrypted second shared secret key $K_{auth}$ and the encrypted key lease (i.e., encrypted with the first shared secret key $K_{WC}$ and the third shared secret key $K_{AP}$) to WC 220. In another embodiment, AP1 transmits the encrypted second shared secret key $K_{auth}$ and the key lease (i.e., encrypted with the third shared secret key $K_{AP}$) to WC 220.

At step 418, WC 220 decrypts the encrypted second shared secret key $K_{auth}$ and the encrypted key lease using the first shared secret key $K_{WC}$. In another embodiment, WC 220 decrypts the encrypted second shared secret key $K_{auth}$ using the first shared secret key $K_{WC}$.

At step 421, a second wireless network access point electronic system (AP2) requests to authenticate WC 220 because WC 220 is now communicating with AP2 rather than AP1, since WC 220 has moved from one physical location to a second physical location.

At step 424, WC 220 transmits the first identifier WC-ID and the key lease to AP2. In another embodiment, the WC 220 transmits the key lease to AP2. In this embodiment, AP2 determines the first identifier WC-ID from a media access control (MAC) address associated with WC 220.

At step 427, AP2 locates the second identifier AP-GROUP of the key lease and determines whether the second identifier AP-GROUP of the key lease is associated with AP2 since the first identifier WC-ID, the first shared secret key $K_{WC}$, the second shared secret key $K_{auth}$, the key lease period, and the integrity function data are encrypted using the third shared secret key $K_{AP}$. At step 430, if the second identifier AP-GROUP of the key lease is not associated with AP2, WC 220 performs the primary authentication protocol with AP2. Otherwise, at step 433, AP2 retrieves the third shared secret key $K_{AP}$ corresponding to the second identifier AP-GROUP from the RADIUS server 250. In another embodiment, the third shared secret key $K_{AP}$ can be stored locally by AP2 rather than being stored at a third party (e.g., RADIUS server 250). In still another embodiment, AP2 maintains and stores the third shared secret key $K_{AP}$ after retrieving the third shared secret key $K_{AP}$ from the RADIUS server 250 during a prior interaction with the RADIUS server 250.

At step 436, AP2 decrypts the lease key using the third shared secret key $K_{AP}$. At step 439, AP2 verifies the integrity function data by processing the first portion of the lease key with an integrity function. At step 442, if the verification is unsuccessful, WC 220 performs the primary authentication protocol with AP2. Otherwise, at step 445, AP2 verifies that the first identifier WC-ID transmitted by WC 220 matches the first identifier WC-ID decrypted from the lease key. At step 448, if the verification is unsuccessful, WC 220 performs the primary authentication protocol with AP2. Otherwise, at step 451, AP2 verifies that the key lease period has not expired. At step 454, if the key lease period has expired, WC 220 performs the primary authentication protocol with AP2. Otherwise, WC 220 performs the secondary authentication protocol with AP2.

In one embodiment, the secondary authentication protocol comprises a mutual challenge-response protocol based on symmetric encryption. In another embodiment, the secondary authentication protocol comprises a mutual challenge-response protocol based on a keyed message authentication code. In still another embodiment, the secondary authentication protocol comprises a mutual challenge-response protocol based on a one-way hash function message authentication code (HMAC) implementation (e.g., HMAC-MD5, HMAC-SHA-1, etc.). It should be understood by one skilled in the art that the secondary authentication protocol can be implemented in any other appropriate manner.

At step 457, AP2 generates the random number C1. At step 460, AP2 encrypts the random number C1 using the second shared secret key $K_{auth}$. At step 463, in one embodiment, AP2 transmits the encrypted random number C1 to WC 220 in accordance with a challenge of a mutual challenge-response protocol.

At step 466, WC 200 decrypts the encrypted random number C1 using the second shared secret key $K_{auth}$. At step 469, WC 220 generates the random number C2. At step 472, WC 220 encrypts a concatenation comprising the random number C2 and the random number C1, using the second shared secret key $K_{auth}$. The encryption function E has the property that a first ciphertext generated (when the random number C2 is encrypted in step 472) is not the equivalent to a second ciphertext generated below in step 490. In one embodiment, the encryption of step 472 utilizes a first initialization vector while the encryption of step 490 utilizes a second initialization vector. Therefore, the encryption of the random number C2 in step 472 results in a ciphertext that is different from the ciphertext generated in step 490.

At step 475, in one embodiment, WC 220 transmits the encrypted concatenation to AP2 in accordance with a challenge of a mutual challenge-response protocol.

At step 478, AP2 decrypts the encrypted concatenation using the second shared secret key $K_{auth}$. At step 481, AP2 verifies that the decrypted random number C1 matches the random number C1 generated by AP2. At step 484, if the verification is unsuccessful, AP2 transmits a first failure status indicator to WC 220. At step 487, WC 220 performs the primary authentication protocol with AP2.

Otherwise, at step 490, AP2 encrypts the random number C2 using the second shared secret key $K_{auth}$. At step 493, AP2 transmits the encrypted random number C2 and a first successful status indicator to WC 220 in accordance with the mutual challenge-response protocol.

At step 494, WC 220 decrypts the encrypted random number C2 using the second shared secret key $K_{auth}$. At step 495, WC 220 verifies that the decrypted random number C2 matches the random number C2 generated by WC 220. At step 496, if the verification is unsuccessful, WC 220 transmits a second failure status indicator to AP2. At step 497, WC 220 performs the primary authentication protocol with AP2.

Otherwise, at step 498, WC 220 transmits a second successful status indicator to AP2 in accordance with the mutual challenge-response protocol.

At step 499, WC 220 has successfully completed the secondary authentication protocol. Now, WC 220 and AP2 can use the first shared secret key $K_{WC}$ to encrypt communications transmitted between WC 220 and AP2.

Figure 5A:
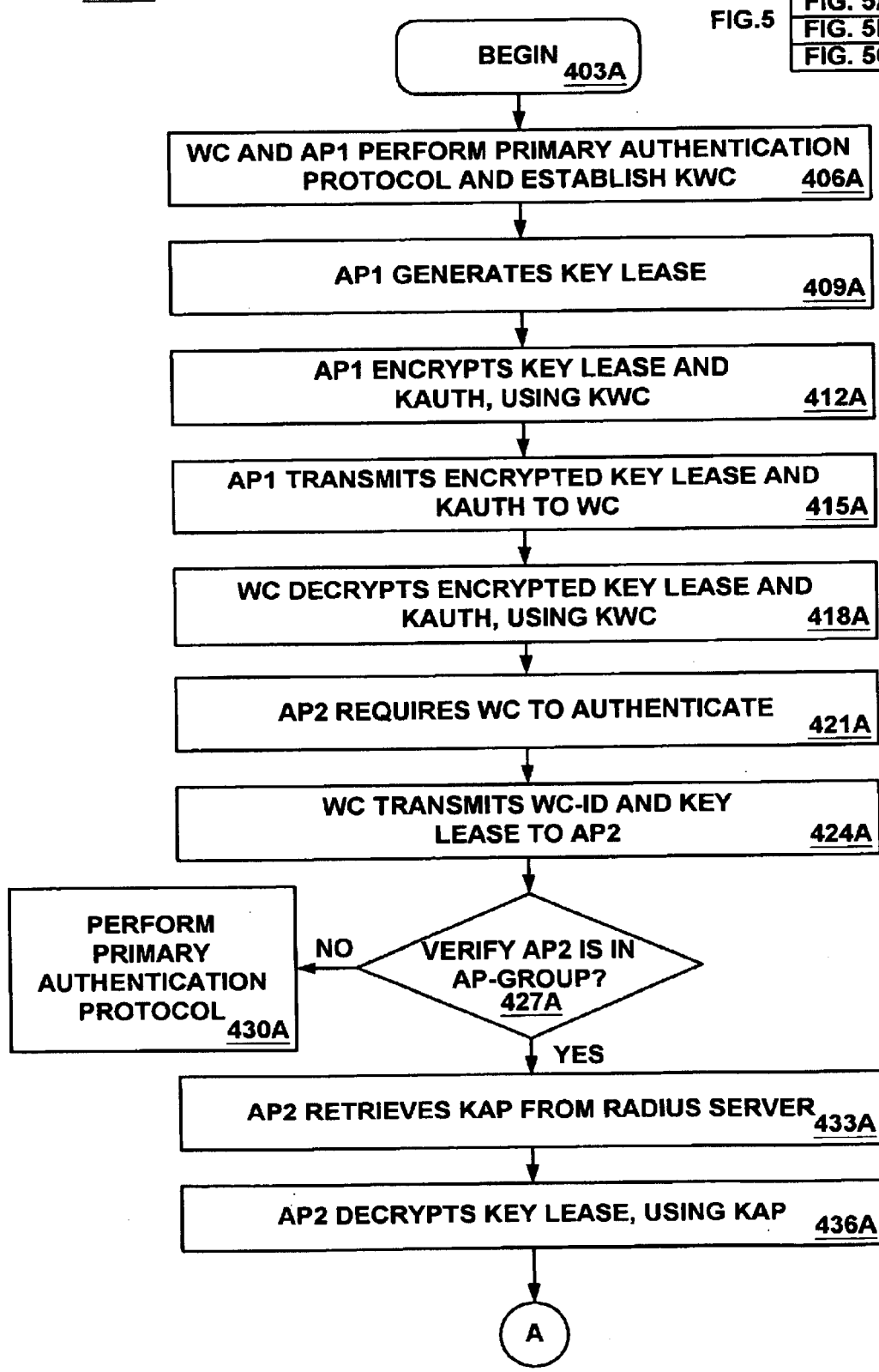
FIG. 5 is a flow chart diagram illustrating steps of authenticating a wireless client electronic system in accordance with a second embodiment of the present invention.
Figure 5B:
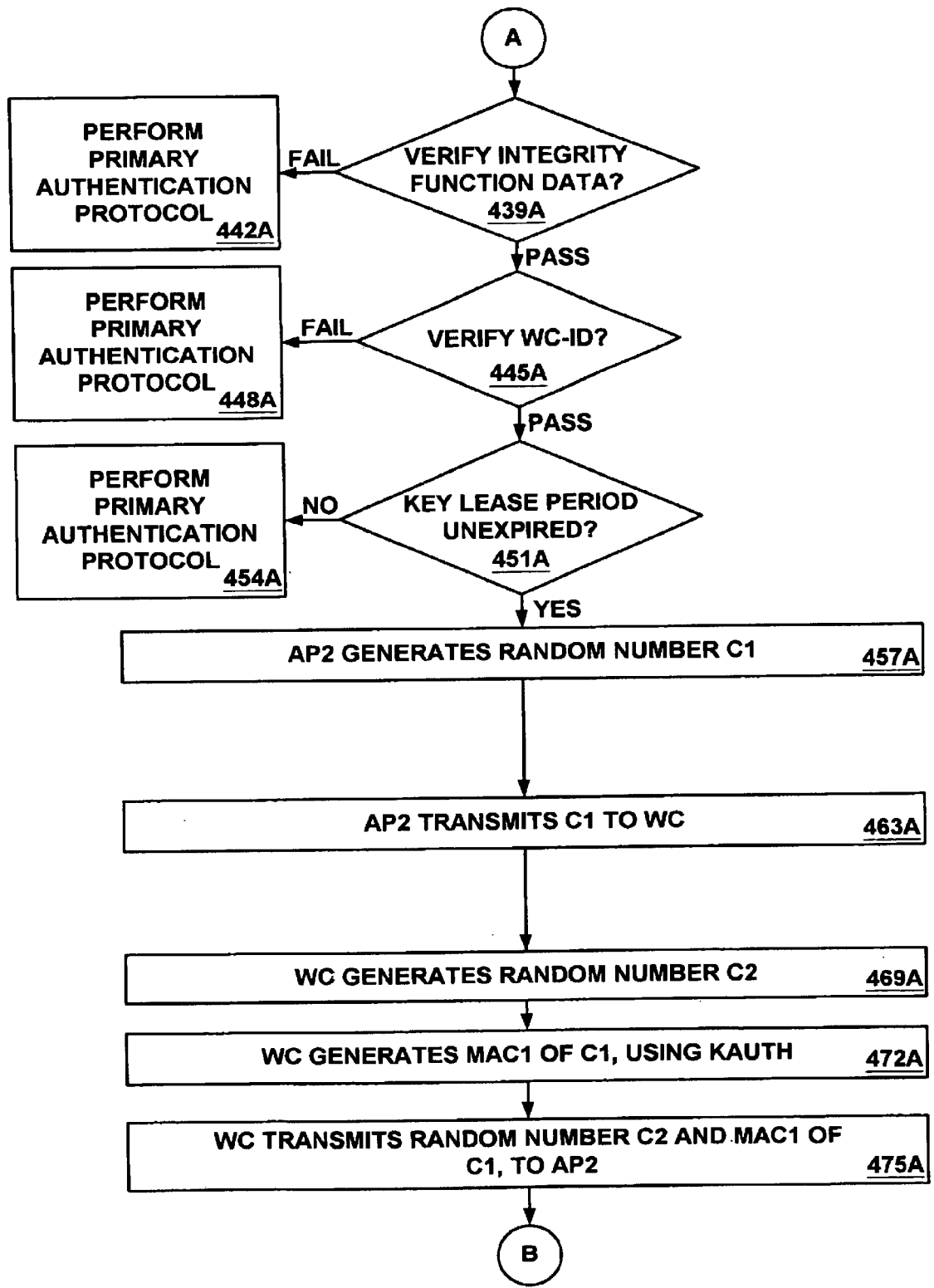
Figure 5C:
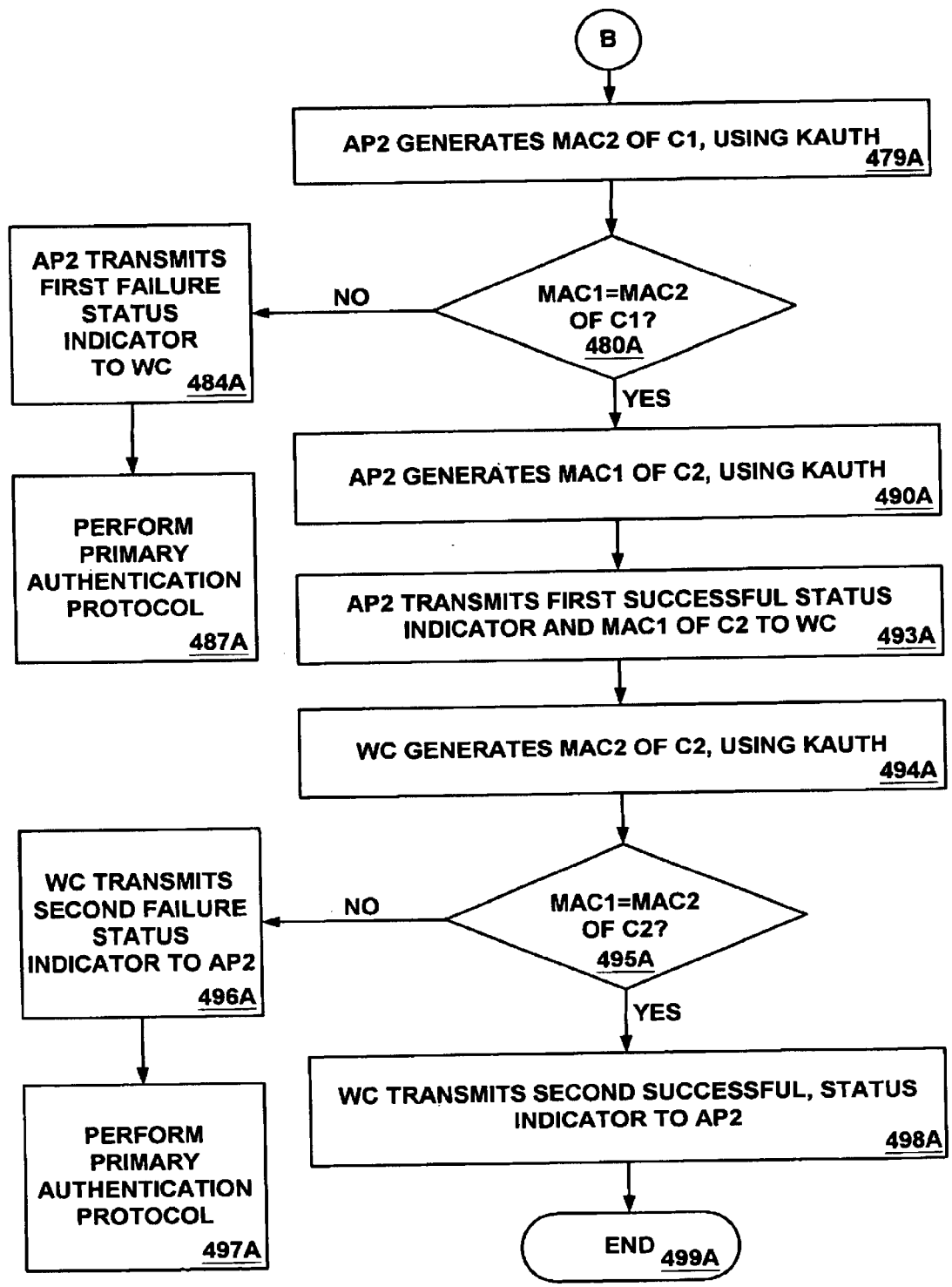

FIG. 5 is a flow chart diagram 400A illustrating steps of authenticating a wireless client electronic system (e.g., WC 220 of FIG. 2) to enable access to a wireless network 200 (FIG. 2) in accordance with a second embodiment of the present invention. The WC 220 authenticates itself by performing either a primary authentication protocol or a secondary authentication protocol, depending on the data of the key lease.

At step 403A, the method of authenticating the WC 220 according to a second embodiment of the present invention begins. At step 406A, the WC 220 authenticates itself to a first network access point electronic system (AP1) by performing a primary authentication protocol as discussed above. During the primary authentication protocol, WC 220 and AP1 establish a first shared secret key $K_{WC}$ for encrypting communications transmitted between WC 220 and AP1.

At step 409A, AP1 generates the key lease. Alternatively, the authentication resource (e.g., RADIUS server 250) generates the first shared secret $K_{WC}$, a second shared secret key $K_{auth}$, and the key lease, and transmits via a secure encrypted channel the first shared secret $K_{WC}$, the second shared secret key $K_{auth}$, and the key lease to AP1. In one embodiment, the key lease comprises a first identifier WC-ID utilized during the primary authentication protocol, the first shared secret key $K_{WC}$, a second shared secret key $K_{auth}$, a key lease period, integrity function data, and a second identifier AP-GROUP associated with AP1, as discussed above. In one embodiment, the first identifier WC-ID, the first shared secret key $K_{WC}$, the second shared secret key $K_{auth}$, the key lease period, and the integrity function data are encrypted using a third shared secret key $K_{AP}$, whereas the third shared secret key $K_{AP}$ is available to AP1 but not to WC 220. The third shared secret key $K_{AP}$ corresponds to the second identifier AP-GROUP. In one embodiment, a RADIUS server 250 (FIG. 2) stores the third shared secret key $K_{AP}$. Since WC 220 does not know the third shared secret key $K_{AP}$, WC 220 cannot decrypt the key lease, nor create another key lease.

At step 412A, AP1 encrypts the second shared secret key $K_{auth}$ and the key lease using the first shared secret key $K_{WC}$. In another embodiment, AP1 encrypts the second shared secret key $K_{auth}$ using the first shared secret key $K_{WC}$.

At step 415A, AP1 transmits the encrypted second shared secret key $K_{auth}$ and the encrypted key lease (i.e., encrypted with the first shared secret key $K_{WC}$ and the third shared secret key $K_{AP}$) to WC 220. In another embodiment, AP1 transmits the encrypted second shared secret key $K_{auth}$ and the key lease (i.e., encrypted with the third shared secret key $K_{AP}$) to WC 220.

At step 418A, WC 220 decrypts the encrypted second shared secret key $K_{auth}$ and the encrypted key lease using the first shared secret key $K_{WC}$. In another embodiment, WC 220 decrypts the encrypted second shared secret key $K_{auth}$ using the first shared secret key $K_{WC}$.

At step 421A, a second wireless network access point electronic system (AP2) requests to authenticate WC 220 because WC 220 is now communicating with AP2 rather than AP1, since WC 220 has moved from one physical location to a second physical location.

At step 424A, WC 220 transmits the first identifier WC-ID and the key lease to AP2. In another embodiment, the WC 220 transmits the key lease to AP2. In this embodiment, AP2 determines the first identifier WC-ID from a media access control (MAC) address associated with WC 220.

At step 427A, AP2 locates the second identifier AP-GROUP of the key lease and determines whether the second identifier AP-GROUP of the key lease is associated with AP2 since the first identifier WC-ID, the first shared secret key $K_{WC}$, the second shared secret key $K_{auth}$, the key lease period, and the integrity function data are encrypted using the third shared secret key $K_{AP}$. At step 430A, if the second identifier AP-GROUP of the key lease is not associated with AP2, WC 220 performs the primary authentication protocol with AP2. Otherwise, at step 433A, AP2 retrieves the third shared secret key $K_{AP}$ corresponding to the second identifier AP-GROUP from the RADIUS server 250. In another embodiment, the third shared secret key $K_{AP}$ can be stored locally by AP2 rather than being stored at a third party (e.g., RADIUS server 250). In still another embodiment, AP2 maintains and stores the third shared secret key $K_{AP}$ after retrieving the third shared secret key $K_{AP}$ from the RADIUS server 250 during a prior interaction with the RADIUS server 250.

At step 436A, AP2 decrypts the lease key using the third shared secret key $K_{AP}$. At step 439A, AP2 verifies the integrity function data by processing the first portion of the lease key with an integrity function. At step 442A, if the verification is unsuccessful, WC 220 performs the primary authentication protocol with AP2. Otherwise, at step 445A, AP2 verifies that the first identifier WC-ID transmitted by WC 220 matches the first identifier WC-ID decrypted from the lease key. At step 448A, if the verification is unsuccessful, WC 220 performs the primary authentication protocol with AP2. Otherwise, at step 451A, AP2 verifies that the key lease period has not expired. At step 454A, if the key lease period has expired, WC 220 performs the primary authentication protocol with AP2. Otherwise, WC 220 performs the secondary authentication protocol with AP2.

In this embodiment, rather than implementing the secondary authentication protocol as a mutual challenge-response protocol based on symmetric encryption, the secondary authentication protocol comprises a mutual challenge-response protocol based on a one-way hash function. In particular, the secondary authentication protocol comprises a mutual challenge-response protocol based on a keyed one-way message authentication code implementation (e.g., HMAC-MD5, HMAC-SHA-1, etc.). It should be understood by one skilled in the art that the secondary authentication protocol can be implemented in any other appropriate manner.

At step 457A, AP2 generates the random number C1. At step 463A, in one embodiment, AP2 transmits the random number C1 to WC 220 in accordance with a challenge of a mutual challenge-response protocol.

At step 469A, WC 220 generates the random number C2. At step 472A, WC 220 generates a first keyed one-way message authentication code (MAC) of the random number C1, using the second shared secret key $K_{auth}$.

At step 475A, in one embodiment, WC 220 transmits the random number C2 and the first keyed one-way message authentication code (MAC) of the random number C1 to AP2 in accordance with a challenge of a mutual challenge-response protocol.

At step 479A, AP2 generates a second keyed one-way message authentication code (MAC) of the random number C1, using the second shared secret key $K_{auth}$. At step 480A, AP2 verifies that the first keyed one-way message authentication code (MAC) of the random number C1 matches the second keyed one-way message authentication code (MAC) of the random number C1. At step 484A, if the verification is unsuccessful, AP2 transmits a first failure status indicator to WC 220. At step 487A, WC 220 performs the primary authentication protocol with AP2.

Otherwise, at step 490A, AP2 generates a first keyed one-way message authentication code (MAC) of the random number C2, using the second shared secret key $K_{auth}$. At step 493A, AP2 transmits the first keyed one-way message authentication code (MAC) of the random number C2 and a first successful status indicator to WC 220 in accordance with the mutual challenge-response protocol.

At step 494A, WC 220 generates a second keyed one-way message authentication code (MAC) of the random number C2, using the second shared secret key $K_{auth}$. At step 495A, WC 220 verifies that the first keyed one-way message authentication code (MAC) of the random number C2 matches the second keyed one-way message authentication code (MAC) of the random number C2. At step 496A, if the verification is unsuccessful, WC 220 transmits a second failure status indicator to AP2. At step 497A, WC 220 performs the primary authentication protocol with AP2.

Otherwise, at step 498A, WC 220 transmits a second successful status indicator to AP2 in accordance with the mutual challenge-response protocol.

At step 499A, WC 220 has successfully completed the secondary authentication protocol. Now, WC 220 and AP2 can use the first shared secret key $K_{WC}$ to encrypt communications transmitted between WC 220 and AP2.

Those skilled in the art will recognize that the present invention may be incorporated as computer instructions stored as computer program code on a computer-readable medium such as a magnetic disk, CD-ROM, and other media common in the art or that may yet be developed.

Finally, one of the embodiments of the present invention is an application, namely, a set of instructions (e.g., program code) which may, for example, be resident in the random access memory of an electronic system (e.g., computer system, personal digital assistant or palmtop computer system, etc.). Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. Thus, the present invention may be implemented as a computer program product for use in an electronic system (e.g., computer system, personal digital assistant, etc.). In addition, although the various methods of the present invention described above are conveniently implemented in an electronic system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of authenticating a client electronic system (client) to allow access to a network having a plurality of network access point electronic systems, said method comprising the steps of:

a) performing a primary authentication protocol involving said client and a first network access point electronic system (first AP) such that a first encryption key is established between said client and said first AP;

b) if said primary authentication protocol is successful, generating a key lease and a first encryption message of a second encryption key using said first encryption key, wherein said key lease comprises a data structure having a first identifier associated with said client, said first encryption key, said second encryption key for performing a secondary authentication protocol, a key lease period for indicating a length of time in which said key lease is valid, integrity function data for determining an unauthorized change to a first portion of said key lease, and a second identifier associated with a particular network access point electronic system group of a plurality of network access point electronic system groups, and further wherein a second portion of said key lease is encrypted using a third encryption key;

c) transmitting via said network to said client said first encryption message and said key lease;

d) if a second network access point electronic system (second AP) requests to authenticate said client, transmitting said first identifier and said key lease to said second AP;

e) if said second AP is associated with said second identifier, retrieving said third encryption key corresponding to the second identifier;

f) decrypting said second portion of said key lease using said third encryption key; and g) if said first identifier transmitted by said client matches said first identifier decrypted from said key lease, if said integrity function data decrypted from said key lease matches an integrity function performed on said first portion of said key lease, and if said key lease period has not expired, performing said secondary authentication protocol involving said client and said second AP, wherein said second encryption key is used for encrypting communications between said client and said second AP during said secondary authentication protocol.

2. A method as recited in claim 1 wherein said secondary authentication protocol comprises a mutual challenge-response protocol based on symmetric encryption.

3. A method as recited in claim 2 wherein step g) comprises the steps of:

generating a second encryption message of a first random number using said second encryption key, wherein said first random number is generated by said second AP;

transmitting via said network to said client said second encryption message;

decrypting said second encryption message using said second encryption key;

generating a third encryption message of a concatenation using said second encryption key, wherein said concatenation comprises said first random number and a second random number, and further wherein said second random number is generated by said client;

transmitting via said network to said second AP said third encryption message;

decrypting said third encryption message using said second encryption key;

if said first random number decrypted from said third encryption message matches said first random number generated by said second AP, generating a fourth encryption message of said second random message using said second encryption key;

transmitting via said network to said client said fourth encryption message and a first successful status indicator;

decrypting said fourth encryption message using said second encryption key; and if said second random number decrypted from said fourth encryption message matches said second random number generated by said client, transmitting via said network to said second AP a second successful status indicator.

4. A method as recited in claim 1 wherein said secondary authentication protocol comprises a mutual challenge-response protocol based on a one-way hash function message authentication code (HMAC) implementation.

5. A method as recited in claim 1 wherein said secondary authentication protocol comprises a mutual challenge-response protocol based on a keyed message authentication code.

6. A method as recited in claim 5 wherein step g) comprises the steps of:

transmitting via said network to said client a first random number, wherein said first random number is generated by said second AP;

generating a first keyed one-way message authentication code of said first random number using said second encryption key;

transmitting via said network to said second AP a second random number and said first keyed one-way message authentication code of said first random number, wherein said second random number is generated by said client;

generating a second keyed one-way message authentication code of said first random number using said second encryption key;

if said first keyed one-way message authentication code of said first random number matches said second keyed one-way message authentication code of said first random number, generating a third keyed one-way message authentication code of said second random number using said second encryption key;

transmitting via said network to said client said third keyed one-way message authentication code of said second random number and a first successful status indicator;

generating a fourth keyed one-way message authentication code of said second random number using said second encryption key; and if said third keyed one-way message authentication code of said second random number matches said second keyed one-way message authentication code of said second random number, transmitting via said network to said second AP a second successful status indicator.

7. A method as recited in claim 1 wherein step c) further includes:

generating an encryption message of said key lease using said first encryption key before transmitting said lease key; and transmitting via said network to said client said encryption message instead of said lease key.

8. A method as recited in claim 7 further comprising the steps of:

decrypting said first encryption message using said first encryption key; and decrypting said encryption message using said first encryption key.

9. A method as recited in claim 1 further comprising the step of decrypting said first encryption message using said first encryption key.

10. A method as recited in claim 1 wherein said first encryption key is equivalent to said second encryption key.

11. A method as recited in claim 1 wherein said first identifier comprises a user identifier.

12. A method as recited in claim 1 wherein step d) further includes transmitting a Media Access Control (MAC) address of said client instead of said first identifier such that said second AP can determine said first identifier from said MAC address.

13. A method as recited in claim 1 wherein said secondary authentication protocol can be performed in a first length of time that is shorter than a second length of time required to perform said primary authentication protocol.

14. A method as recited in claim 1 wherein said first portion of said key lease comprises said first identifier, said first encryption key, said second encryption key, and said key lease period.

15. A method as recited in claim 1 wherein said second portion of said key lease comprises said first identifier, said first encryption key, said second encryption key, said key lease period, and said integrity function data.

16. A method as recited in claim 1 wherein said key lease period is 24 hours.

17. A method as recited in claim 1 wherein said key lease period is 8 hours.

18. A method as recited in claim 1 wherein said client electronic system is a wireless client electronic system.

19. A method as recited in claim 1 wherein said network access point electronic system is a wireless network access point electronic system.

20. A method as recited in claim 1 wherein said network is a wireless network.

21. A method as recited in claim 1 wherein step e) comprises retrieving said third encryption key from an authentication resource.

22. A method as recited in claim 21 wherein said authentication resource comprises a RADIUS server.

23. A method as recited in claim 1 wherein step e) comprises retrieving said third encryption key from a storage location of said second AP.

24. A network comprising:
- a first network access point electronic system (first AP) coupled to said network;
- a second network access point electronic system (second AP) coupled to said network; and
- a client electronic system (client) configured to couple to said network, wherein said client and said first AP perform a primary authentication protocol such that a first encryption key is established between said client and said first AP,
- wherein said first AP is configured to generate a first encryption message of a second encryption key using said first encryption key if said primary authentication protocol is successful,
- wherein said first AP is configured to transmit via said network to said client said first encryption message and a key lease,
- wherein said key lease comprises a data structure having a first identifier associated with said client, said first encryption key, said second encryption key for performing a secondary authentication protocol, a key lease period for indicating a length of time in which said key lease is valid, integrity function data for determining an unauthorized change to a first portion of said key lease, and a second identifier associated with a particular network access point electronic system group of a plurality of network access point electronic system groups, and further wherein a second portion of said key lease is encrypted using a third encryption key,
- wherein said client is configured to transmit said first identifier and said key lease to said second AP if said second AP requests to authenticate said client,
- wherein said second AP is configured to retrieve said third encryption key corresponding to the second identifier,
- wherein said second AP is configured to decrypt said second portion of said key lease using said third encryption key, and
- wherein if said first identifier transmitted by said client matches said first identifier decrypted from said key lease by said second AP, if said integrity function data decrypted from said key lease by said second AP matches an integrity function performed by said second AP on said first portion of said key lease, and if said key lease period has not expired, said client and said second AP perform said secondary authentication protocol, and
- wherein said second encryption key is used for encrypting communications between said client and said second AP during said secondary authentication protocol.

25. A network as recited in claim 24 wherein said secondary authentication protocol comprises a mutual challenge-response protocol based on symmetric encryption.

26. A network as recited in claim 25 wherein said second AP is configured to generate a second encryption message of a first random number using said second encryption key,
- wherein said first random number is generated by said second AP,
- wherein said second AP is configured to transmit via said network to said client said second encryption message,
- wherein said client is configured to decrypt said second encryption message using said second encryption key,
- wherein said client is configured to generate a third encryption message of a concatenation using said second encryption key, wherein said concatenation comprises said first random number and a second random number, and further wherein said second random number is generated by said client,
- wherein said client is configured to transmit via said network to said second AP said third encryption message,
- wherein said second AP is configured to decrypt said third encryption message using said second encryption key;
- wherein said second AP is configured to generate a fourth encryption message of said second random message using said second encryption key if said first random number decrypted by said second AP from said third encryption message matches said first random number generated by said second AP,
- wherein said second AP is configured to transmit via said network to said client said fourth encryption message and a first successful status indicator,
- wherein said client is configured to decrypt said fourth encryption message using said second encryption key, and
- wherein said client is configured to transmit via said network to said second AP a second successful status indicator if said second random number decrypted by said client from said fourth encryption message matches said second random number generated by said client.

27. A network as recited in claim 24 wherein said secondary authentication protocol comprises a mutual challenge-response protocol based on a one-way hash function message authentication code (HMAC) implementation.

28. A network as recited in claim 24 wherein said secondary authentication protocol comprises a mutual challenge-response protocol based on a keyed message authentication code.

29. A network as recited in claim 28 wherein said second AP is configured to transmit via said network to said client a first random number,
- wherein said first random number is generated by said second AP;
- wherein said client is configured to generate a first keyed one-way message authentication code of said first random number using said second encryption key;
- wherein said client is configured to transmit via said network to said second AP a second random number and said first keyed one-way message authentication code of said first random number, wherein said second random number is generated by said client;

wherein said second AP is configured to generate a second keyed one-way message authentication code of said first random number using said second encryption key;

wherein said second AP is configured to generate a third keyed one-way message authentication code of said second random number using said second encryption key if said first keyed one-way message authentication code of said first random number matches said second keyed one-way message authentication code of said first random number;

wherein said second AP is configured to transmit via said network to said client said third keyed one-way message authentication code of said second random number and a first successful status indicator;

wherein said client is configured to generate a fourth keyed one-way message authentication code of said second random number using said second encryption key; and wherein said client is configured to transmit via said network to said second AP a second successful status indicator if said third keyed one-way message authentication code of said second random number matches said second keyed one-way message authentication code of said second random number.

30. A network as recited in claim 24 wherein said first AP is configured to generate an encryption message of said key lease using said first encryption key before transmitting said lease key, and wherein said first AP is configured to transmit via said network to said client said encryption message instead of said lease key.

31. A network as recited in claim 30 wherein said client is configured to decrypt said first encryption message using said first encryption key, and wherein said client is configured to decrypt said encryption message using said first encryption key.

32. A network as recited in claim 24 wherein said client is configured to decrypt said first encryption message using said first encryption key.

33. A network as recited in claim 24 wherein said first encryption key is equivalent to said second encryption key.

34. A network as recited in claim 24 wherein said first identifier comprises a user identifier.

35. A network as recited in claim 24 wherein said client is configured to transmit a Media Access Control (MAC) address of said client instead of said first identifier such that said second AP can determine said first identifier from said MAC address.

36. A network as recited in claim 24 wherein said secondary authentication protocol can be performed in a first length of time that is shorter than a second length of time required to perform said primary authentication protocol.

37. A network as recited in claim 24 wherein said first portion of said key lease comprises said first identifier, said first encryption key, said second encryption key, and said key lease period.

38. A network as recited in claim 24 wherein said second portion of said key lease comprises said first identifier, said first encryption key, said second encryption key, said key lease period, and said integrity function data.

39. A network as recited in claim 24 wherein said key lease period is 24 hours.

40. A network as recited in claim 24 wherein said key lease period is 8 hours.

41. A network as recited in claim 24 wherein said client electronic system is a wireless client electronic system.

42. A network as recited in claim 24 wherein said network access point electronic system is a wireless network access point electronic system.

43. A network as recited in claim 24 wherein said network is a wireless network.

44. A network as recited in claim 24 further comprising an authentication resource.

45. A network as recited in claim 44 wherein said authentication resource generates said key lease and transmits said key lease to said first AP.

46. A network as recited in claim 45 wherein said authentication resource generates said second encryption key and transmits said second encryption key to said first AP.

47. A network as recited in claim 46 wherein said authentication resource generates said first encryption key and transmits said second encryption key to said first AP.

48. A network as recited in claim 47 wherein said authentication resource comprises a RADIUS server.

49. A network as recited in claim 44 wherein said second AP retrieves said third encryption key from said authentication resource.

50. A network as recited in claim 49 wherein said authentication resource comprises a RADIUS server.

51. A network as recited in claim 24 wherein said second AP retrieves said third encryption key from a storage location of said second AP.

* * * * *